(12) United States Patent
Feld et al.

(10) Patent No.: US 7,758,461 B2
(45) Date of Patent: Jul. 20, 2010

(54) SHAVED TOOTH PLATE

(75) Inventors: Erwin Feld, Riemerling (DE); Andreas Bongard, Pähl (DE)

(73) Assignee: iwis motorsysteme GmbH & Co. KG, München (DE)

( * ) Notice: Subject to any disclaimer, the term of this patent is extended or adjusted under 35 U.S.C. 154(b) by 60 days.

(21) Appl. No.: 12/029,061

(22) Filed: Feb. 11, 2008

(65) Prior Publication Data
US 2008/0194367 A1 Aug. 14, 2008

(30) Foreign Application Priority Data
Feb. 12, 2007 (DE) .................. 20 2007 002 046 U

(51) Int. Cl.
*F16G 13/04* (2006.01)
(52) U.S. Cl. ...................................... 474/212
(58) Field of Classification Search ............... 474/206, 474/209, 212, 213; *F16G 13/04; B21I 9/02*
See application file for complete search history.

(56) References Cited

U.S. PATENT DOCUMENTS

| | | | | |
|---|---|---|---|---|
| 5,154,674 A * | 10/1992 | Avramidis et al. | .......... | 474/214 |
| 6,155,945 A * | 12/2000 | Matsuda | ...................... | 474/212 |
| 6,435,996 B2 * | 8/2002 | Horie et al. | ................. | 474/213 |
| 6,450,910 B1 | 9/2002 | Matsumoto et al. | | |
| 6,533,107 B2 * | 3/2003 | Suzuki et al. | ............... | 198/834 |
| 6,612,103 B2 * | 9/2003 | Matsuda et al. | ................... | 59/5 |
| 7,021,176 B2 * | 4/2006 | Sato et al. | ..................... | 76/29 |
| 2002/0155911 A1 * | 10/2002 | Hummel et al. | ............. | 474/212 |
| 2006/0217224 A1 * | 9/2006 | Girg et al. | .................... | 474/206 |
| 2007/0032325 A1 * | 2/2007 | Shimaya et al. | ............. | 474/213 |

FOREIGN PATENT DOCUMENTS

| | | |
|---|---|---|
| DE | 197 54 489 A1 | 6/1998 |
| DE | 10 2004 021 695 A1 | 1/2005 |
| EP | 1 510 727 A2 | 3/2005 |
| JP | 9-217796 A | 8/1997 |
| JP | 2000-035088 A | 2/2000 |
| JP | 2002266951 A | 9/2002 |
| WO | WO 2007/076759 A1 | 7/2007 |

* cited by examiner

*Primary Examiner*—Robert A Siconolfi
*Assistant Examiner*—Anna Momper
(74) *Attorney, Agent, or Firm*—Leydig, Voit & Mayer Ltd.

(57) ABSTRACT

The present invention relates to a tooth plate for an inverted tooth chain with two hinge openings spaced apart in the longitudinal direction and a tooth plate contour with two teeth arranged on one side in the longitudinal direction, the teeth each being limited by an outer flank and an inner flank. Here, at least one section of the tooth plate contour is shaved, where the ends of the shaved section comprise an overcut. This overcut is arranged in a low-stress area of the tooth plate contour. The invention further relates to a corresponding method for the manufacture of such a tooth plate with the pre-punching and shaving of a section of the tooth plate contour, wherein the overcut at least one end is arranged in a low-stress area of the tooth plate contour. In the subsequent normal punching of the non-shaved areas, the normally punched area of the tooth plate contour and the at least one shaved section meet in the area of the overcut at an angle to each other.

6 Claims, 4 Drawing Sheets

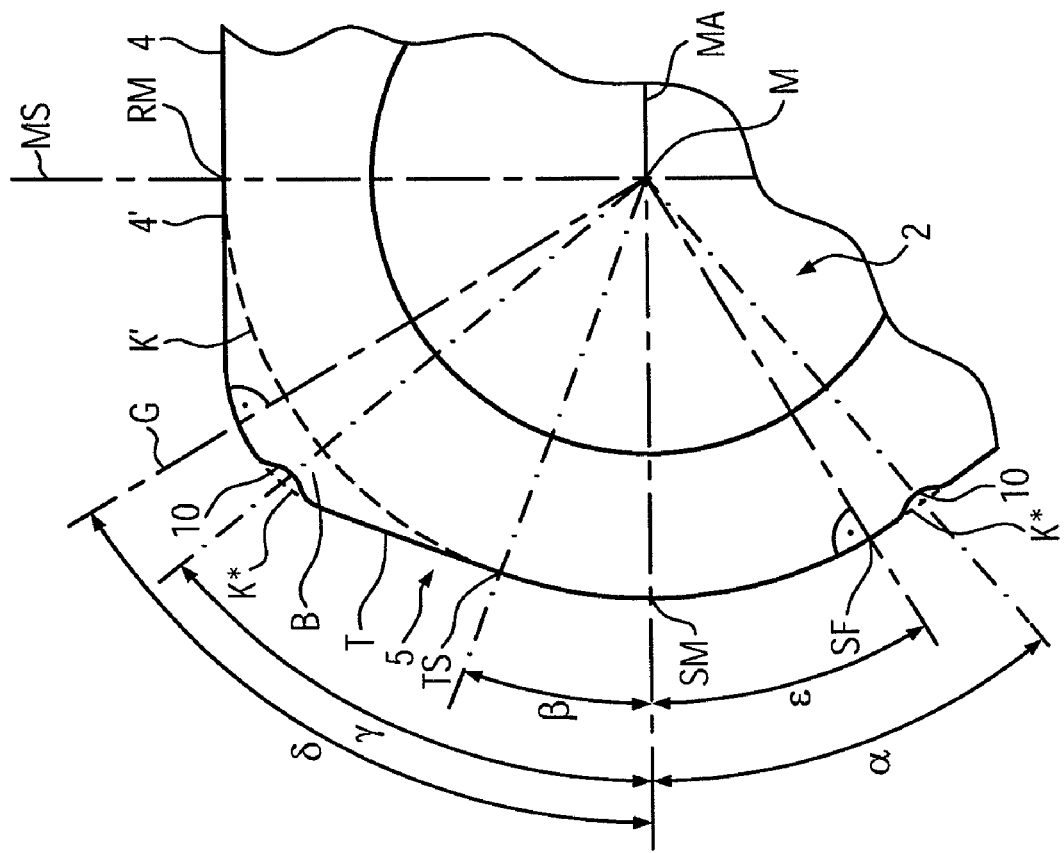
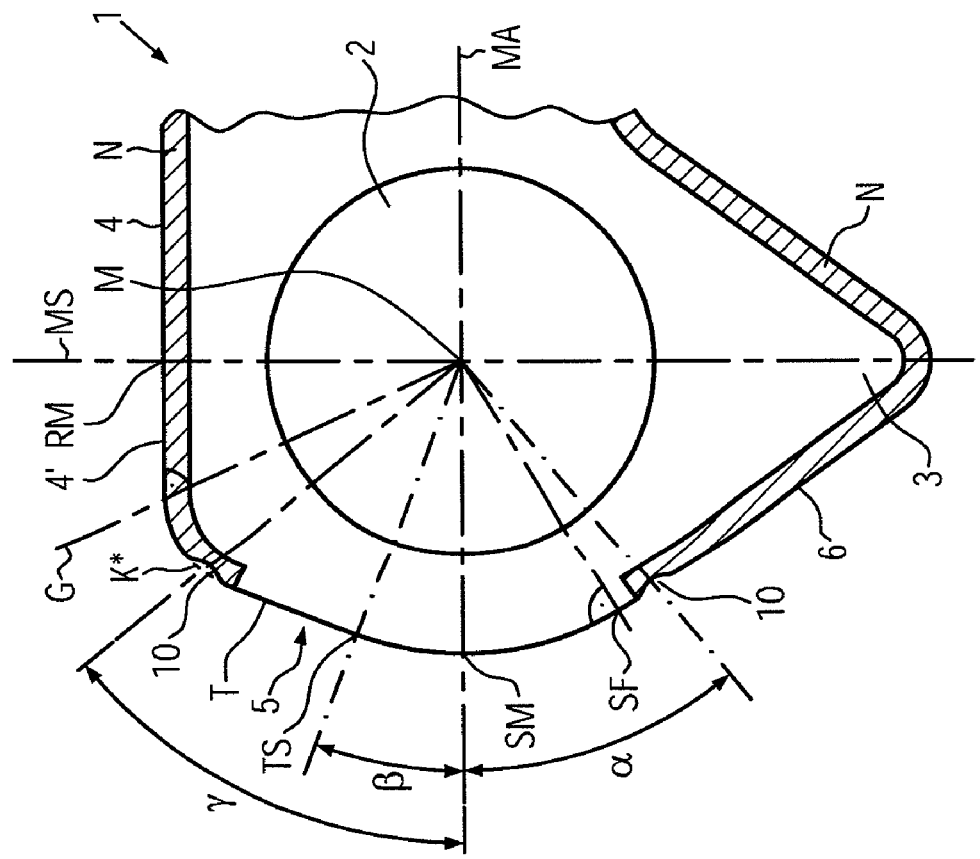
FIG. 3b
FIG. 3a

SHAVED TOOTH PLATE

The present invention relates to a tooth plate for a tooth plate chain with two hinge openings spaced apart in the longitudinal direction and a surrounding tooth plate contour with two teeth arranged on one side in the longitudinal direction, the teeth each being limited with an outer flank and an inner flank, wherein at least one section of the tooth plate contour is shaved and the ends of the shaved section comprise an overcut. The invention furthermore relates to a corresponding inverted tooth chain with several shaved tooth plates.

Tooth plates for silent inverted tooth chains which are in particular employed as driving chains in internal combustion engines are in prior art normally already manufactured in a two-phase punching process. In the process, the tooth plate contour and usually also the hinge openings are roughly pre-punched from a steel plate with a number of different punches before particularly loaded sections of the tooth plate contour and the pin holes are shaved in a second punching step.

In rough punching, the tooth plate contour to be produced is cut out of the steel plate with some oversize, the clearance between the punch and the matrix usually being more than 5% of the material thickness, the cut, however, is only tear-free for up to 30% of the material thickness (shear cut proportion), while the rest of the material thickness is not cut but rather torn off. In shaving, the contour roughly pre-punched with some oversize is punched to its end measure in a shaving cut. Due to the small chip width of the shaving cut, the cut edge is smoothed and a shear cut proportion of approx. 50 to 75% is achieved. The clearance between punch and die is only approx. 3% of the material thickness for shaving.

Due to the shaving of the tooth plate contour and the hinge holes, the formation of microscopic fissures and recesses is prevented, i.e. the tear-free cut edge proportion is significantly increased resulting in significant improvement of wear resistance and permissible continuous load.

From the DE 197 54 489 A1, for example, a tooth plate is known in which the internal surface of the pinholes of the plate is smoothed with a shaving process. In contrast, the JP 09-217796 A shows a tooth plate in which the inner and outer flanks of the teeth are brought to their end measures in a shaving process, which reduces the wear of a chain made from these tooth plates and the generation of noise and vibrations. In the JP 2000-035088 A, a tooth plate is moreover described in which, apart from the hinge openings and the inner and outer flanks of the teeth, the back area of the tooth plate is also shaved with a shear cut proportion of more than 70% to increase the strength of these areas in addition to the wear resistance and the reduction of vibration and noise.

A method of pre-punching and shaving tooth plates is described in the DE 10 2004 021 695 A1. Here, first only those areas of the tooth plate contour and of the hinge openings which have to be shaved are punched out of a steel plate, so that the roughly pre-punched tooth plate is still stably connected to the steel plate in the bent front area of the tooth plate. Subsequently, in the second processing step, in reverse order and punching direction, first all sections of the tooth plate contour to be shaved are cut by shaving dies to obtain their end measures before the tooth plate is finally detached from the steel plate at the bent front areas of the tooth plate contour. This method permits to avoid positioning inaccuracies occurring in conventional methods and to ensure parallelism between the respective surfaces.

In tooth plates known from prior art, the shaving of pre-punched tooth plate contours did not only lead to an enlargement of the tear-free cut edge, but also effected increased strength and wear resistance of the shaved sections as well as a reduction of noise and vibration generation by the improved cut edge. In the process, overcut areas, i.e. transitions of the shaved cut edge with a high shear cut proportion to the roughly punched out cut edge with a low shear cut proportion are formed by the two opposite shaving punches for the tooth shape and the back contour at the transition to the non-shaved side contour, respectively, which the punch produces for detaching the tooth plate from the punching grids. In this transitional area, the separating punch cuts into the section of the already shaved tooth plate contour for the tooth shape and the back portion. In this area, where the shaved sections of the tooth plate contour adjoin the roughly punched sections, i.e. the non-shaved sections, a notch is formed which is generally referred to as overcut. By the overcut, a notch effect is produced which has a negative influence on the distribution of stress in the tooth or link plate. The smaller the overcut is in the overcut area, the lower is the load in the distribution of stress, where a significant portion of the stress load is exclusively generated by the transition of the high shear cut proportion to the low shear cut proportion of the tooth plate contour.

It is an object of the present invention to improve the properties of shaved tooth plates, in particular in the transitional area of the shaved areas and the punched areas of the tooth plate contour.

According to the invention, this object is achieved by a generic tooth plate where the overcut is arranged in a low-stress area of the tooth plate contour.

In conventional shaved tooth plates, the transitional area from the area of the tooth plate contour punched in one step to the shaved section involves problems. Either in a transition corresponding to the undisturbed tooth plate contour, the tear-free cut proportion is lower, so that in this case, in addition to the deteriorated distribution of stress, the desired strength and wear values are not achieved, possibly resulting in reduced accuracy of the tooth plate contour, which in turn has a negative effect on noise and vibration behavior, or the strength of the tooth plate is reduced by the additional notch effect of the overcut deviating with respect to the undisturbed tooth plate contour as the geometric deviation of the overcut leads to a disturbance in the distribution of stress in the transitional area. By the inventive embodiment of a tooth plate with an overcut in the transitional area at the ends of the shaved area of the tooth plate contour, a high shear cut proportion and high accuracy of the tooth plate contour are achieved, and a weakening of the distribution of stress in the tooth plate in the transitional area is prevented. With the arrangement of the overcut in a low-stress area of the tooth plate contour, the strength properties of the tooth plate can be improved altogether.

In conventional tooth plates, the transitional area and thus also a corresponding overcut are usually located following the areas of the tooth plate contour shaved for the engagement with a chain wheel or for the guidance at a slide rail, e.g. at the end of the back or at the end of the tooth flank each in the transition to the bent front sides of the tooth plate. The inventive arrangement of the overcuts in such low-stress areas leads to an averaging of the distribution of stress compared to conventional tooth plates with overcuts and to a prevention of stress concentrations in the area of the overcuts. By the tooth plate according to the invention, the strength and wear properties as well as noise and vibration reduction improved by shaving roughly pre-punched tooth plate contours can be realized without restrictions as by the arrangement of the overcut in a low-stress area of the tooth plate contour, the properties of the tooth plate improved by the increased tear-free shear cut proportion are not consumed by the weakening of stress-loaded contour sections.

Here, the overcut itself is preferably set back with respect to the adjacent areas of the tooth plate contour. The formation of the geometric deviation of the overcut with respect to the tooth plate contour as back-set area can be relatively easily already included in the pre-punching and shaving operations, so that in the punching of the adjacent contours, the punch can engage with the back-set overcut at a relatively large angle to thus avoid a flowing of the plate material or a deviation of the punch. In the process, the overcut can have a concave shape for a low-stress design which can be in particular formed as segment of a circle. For secure punching and a stress increase in the area of the overcut as well distributed as possible, the radius of an overcut formed as a segment of a circle can be between 0.3 mm and 2.0 mm, preferably between 0.5 mm and 1.0 mm. The connection of the concave overcut to the adjacent areas of the tooth plate contour is preferably effected by means of small convex sections with adapted radius, advantageously in the radius of the concave area.

An advantageous embodiment provides for the shaved section of the tooth plate contour to extend over the inner flank and/or the outer flank of a tooth. In particular in the shaving of the tooth flanks, at the end of the shaved area often either a reduced shear cut proportion or deteriorated accuracy occur. Moreover, the tooth flanks of a tooth plate are particularly stressed in the operation of a tooth plate chain and contribute to noise generation, so that here the advantages of the embodiment of a tooth plate according to the invention are particularly effective. Favorably, the shaved section of the tooth plate contour can in this case extend from the outer flank of a tooth over its inner flank and the inner flank of the adjacent tooth as well as its transitional area to the outer flank of the adjacent tooth. In such an embodiment, the number of the end areas and thus the required overcuts over the area of the tooth plate contour formed as teeth can be reduced to two.

To only slightly affect the distribution of stress in the tooth plate contour if possible, the overcut of a section shaved along the outer flank can be arranged at the end of the outer flank in front of the transition to the bent front area of the tooth plate contour. In the arrangement of the overcut at the end of the outer flank of the teeth it has to be observed that the overcut is not arranged in the area of the outer flank coming into contact with the tooth flanks of an associated chain wheel, or that the outer flank of the tooth plate teeth extends beyond the area of contact with the chain wheel towards the bent front side area to receive the overcut there.

Advantageously, the overcut is arranged at a distance from the central line within an angular area around the center of the hinge opening of 30° to 55°, preferably between 35° and 50°, to position the overcut in a relatively low-stress section of the tooth plate contour and simultaneously not to risk premature failure even in case of permanent load by the engagement of the teeth with a chain wheel. Here, in a circular hinge opening for round hinge pins, the center is the geometric center of a circuit, while in hinge openings for rocker joints, the center is the pitch point of the rocker joints in a longitudinally stretched chain orientation.

Another embodiment provides for the shaved section of the tooth plate contour to extend over the back of the tooth plate contour extending in the longitudinal direction. With respect to the different requirements of application for tooth plate chains, e.g. the supporting guidance of the tooth plate chain over the back sections of the tooth plates, it is important to also shave the straight or slightly concave back section of the tooth plate contour to permit the advantageous strength and noise generation properties for all sections of the tooth plate contour that come into contact with other components. Here, it is advantageous for the overcut of an area shaved along the back to be arranged in the bent front area of the tooth plate contour adjacent to the back, i.e. no longer in the actual area of the back usually extending between the mid-perpendiculars of the hinge openings, but only after the reversal point between the straight back and the front side area, so as to not disturb the distribution of stress in the actual back area of the tooth plate and not to allow any weakening of the strength of the tooth plate by an overcut in the back or in the direct transition from the back to the bent front area.

A preferred embodiment provides for the bent front side area of the tooth plate contour adjacent to the back to project with respect to a contour continuously extending in a curved manner around the center of the circular hinge opening or hinge opening formed for rocker joints, between a back intersection of the back with a mid-perpendicular, i.e. perpendicular to the back or the center line, through the hinge opening and the transition of the bent front side area to the outer flank, preferably between the back intersection and a side intersection of the side area with the center line of the tooth plate, and for the overcut to be arranged in the projecting area of the tooth plate contour. In conventional tooth plates, the bent front side area extends from the transition to the outer flank over the side intersection to the back intersection at an essentially constant or continuously changing distance to the center of the adjacent hinge opening. In a material-optimized embodiment of the tooth plate, the distance of the transition between the outer flank and the front side area as well as of the side and back intersections to the center of the hinge opening is equal, so that a material strip of the same width extends over the bent front side area around the hinge opening. As, however, due to its notch effect the overcut between back and side areas leads to a load of the distribution of stress in the tooth plate and thus to local weakening of the tooth plate, the distance to the center of the hinge opening is often longer in the back intersection, so that at least between the side intersection and the back intersection, an essentially continuous increase of the distance to the center and the width of the material strip results. By the utilization of the area of the tooth plate contour projecting with respect to such a conventional extension of the contour to arrange the overcut, the present invention permits the provision of a material-optimized chain link at an essentially equal distance of the transition, as well as side and back intersections to the center of the hinge opening, without thereby negatively affecting the distribution of stress in the tooth plate or other properties of the tooth plate. By the small distance of the back intersection which becomes possible with this construction, material is saved over the whole length of the back without impairing the fitness for use, which results in an efficient and nevertheless light tooth plate chain.

A modification provides for the back to be essentially arranged in parallel to the center line, wherein the essentially parallel section of the back extends over the back intersections between the back and the mid-perpendicular through the centers of the hinge opening. Such an embodiment of the projecting area of the tooth plate chain extends the supporting surface of the tooth plate chain at a slide or guide rail in a timing chain drive pressing on the back, whereby the guide and synchronism or constant-velocity properties can be improved with simultaneously reduced wear and less noise generation. Apart from a purely parallel orientation of the back to the central line of the tooth plate through the centers of the hinge opening, the back can equally have a slightly concave design to permit better abutting and pressure behavior of the slide and guide rails at the tooth plate chain in an application in a special timing chain drive. In this case, the area of the back contour that remains the same and extends over the back intersections then has a correspondingly slightly concave design.

For a simple low-stress embodiment of the projecting area of the tooth plate chain, the bent front side area can comprise a straight tangential section between the side intersection and the back intersection, wherein the tangential section starts at a distance to the side intersection in a starting point, and the inclination of a tangent with respect to the tooth plate contour corresponds to the inclination of the tangential section in this starting point. Here, the soft transition from the bent contour of the front side area into the straight tangential section achieved by the use of the tangential angle of the transition point prevents the forming of stress concentrations or increased stresses in this area. Preferably, the straight tangential section starts within an angular section around the center of the hinge opening of 10° to 25°, preferably of 15 to 20°, in particular of approx. 18°. In this angular area, the projecting area of the tooth link chain is particularly suited for arranging the overcut. In case of smaller angles, the projecting area becomes too large, so that too much material is consumed and the function of the tooth plate can be impaired, while in case of a too large angle, the projecting area becomes too small to accommodate the overcut without any negative influence on the distribution of stress. Furthermore, the overcut can be arranged at a distance from the center line within an angular area around the center of the hinge opening of 40° to 70°, preferably between 50° and 65°, to achieve a stress increase as well distributed as possible.

Preferably, the overcut can be arranged in the section of the projecting area of the tooth plate contour that is projecting furthest. As the distribution of stress in the tooth plate is essentially determined at the conventional thickness of the material strip around the hinge opening determined by the distances of the back and side intersections to the outer wall of the hinge opening, the area of lowest stress is found in the section of the projecting area of the tooth link chain which projects furthest, which is why the arrangement of the overcut here causes the least influence of the distribution of stress by the notch effect of the overcut. Here, the section which projects furthest is the section that comprises the largest distance to the center of the hinge opening when a tooth plate contour is not overcut, the center being determined depending on the shape of the hinge opening as geometric center or as pitch point of the rocker joints.

The present invention further relates to an inverted tooth chain with tooth plates according to the invention which are interconnected at chain links, each chain link comprising one hinge pin and at least two tooth plates essentially arranged one next to the other, the aligned hinge opening of which each surrounds the hinge pin or a hinge sleeve. Such an inverted tooth chain achieves improved strength and wear resistance compared to conventional tooth plate chains and at the same time reduced noise and vibration generation, without accepting a load of the distribution of stress in the tooth plate with stress concentrations in the area of the transitions due to the overcuts between shaved and punched out areas of the tooth plate contour.

To achieve a better lubricating film in the chain hinge, the inverted tooth chain can also be designed as a tooth sleeve chain, for which purpose each chain hinge comprises a hinge sleeve through which the hinge pin extends and on which the tooth plates are arranged for forming the internal chain link. Such a tooth sleeve chain with improved wear can be provided with outer plates which form the external chain links together with the hinge pins. In this case, instead of conventional oblong link plates, tooth plates or a combination of tooth plates and conventional link plates can also be employed. For fixing the chain links, the external plates are pressed and/or riveted onto the hinge pins.

Below, an embodiment of the present invention will be illustrated more in detail with reference to a drawing. In the drawings:

FIG. 1 shows a side view of a tooth plate according to the invention,

FIG. 2*a* shows an enlarged representation of an end area of the section of the tooth plate contour shaved at the back, FIG. 2*b* shows an enlarged representation of an end area of the section of the tooth plate contour shaved at the teeth, FIG. 3*a* shows an enlarged representation of a portion of the tooth plate of FIG. 1, FIG. 3*b* shows an enlarged detail view of the bent front side portion of FIG. 3*a*;

Figure 1:
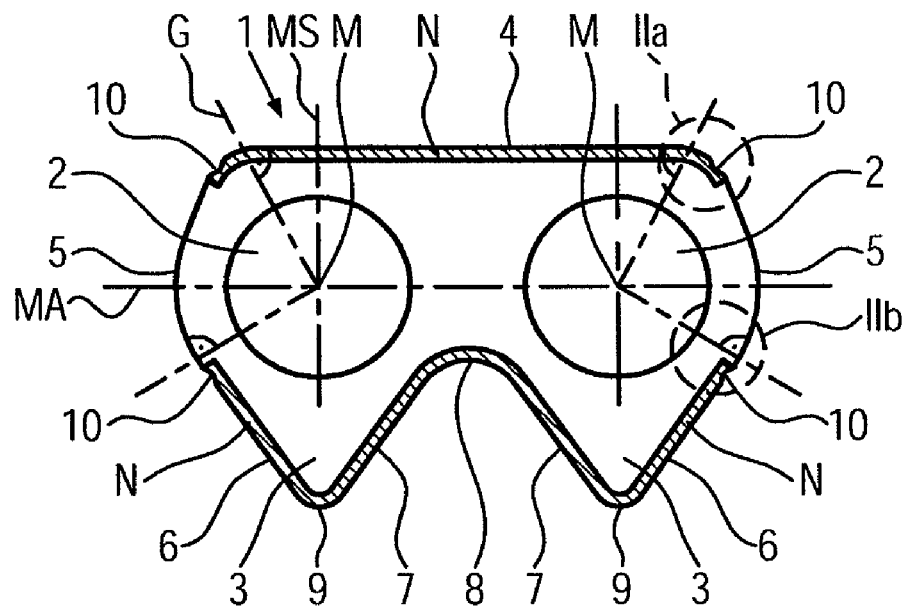

FIG. 1 shows a side view of a tooth plate 1 with two circular hinge openings 2 and a tooth plate contour of two merging teeth 3, a back portion 4 and two bent front side areas 5 connecting the teeth 3 with the back portion 4. The two teeth 3 arranged one next to the other comprise two outer flanks 6 on the sides facing away from each other and inner flanks 7 on the sides facing each other, where the inner flanks 7 are connected to each other in a bifurcation area 8, while the outer flanks 6 and the inner flanks 7 of the teeth 3 merge in the tooth tops 9. Here, the outer flanks 6 adjoin the bent front side area 5 of the tooth plate 1 which surrounds the same at a distance to the hinge openings 2, where the outer flank 6 ends at the point SF where the straight section of the tooth plate contour passes into the bent front side area 5 over the outer flank 6. Thus, point SF can be considered as reversal point. Correspondingly, the change between the bent front side area 5 and the back side 4 is also defined by a reversal point, point RS, where the straight back area of the tooth plate contour passes into the bent front side area 5. As can be seen in the tooth plate 1 which is shown in FIG. 1, here the shaved back portion 4, 4' extends at both ends to an already bent area.

Alternatively to the tooth plate 1 which is shown in FIG. 1 with hinge openings 2 for accommodating round hinge pins or round hinge sleeves, the tooth plate according to the invention can also be designed with hinge openings for accommodating rockerjoints. The shape of the hinge opening is in this case no longer circular but adapted to the rounded triangular shape of the rocker joints accommodated in pairs in a hinge opening. The center of this hinge opening then results from the pitch point of the two rocker joints, i.e. the point of contact of the two rocker contours with each other, in a long-stretched chain orientation, i.e. an orientation of the chain towards the center line MA.

As is denoted at the tooth plate 1 in FIG. 1 to FIG. 3*a*, the tooth plate contour is partially produced with the shaving technique. The back 4 of the tooth plate 1 as well as the outer and inner flanks 6, 7, the bifurcation area 8 and the tooth tops 9 of the teeth 3 have been shaved in the shaving area N. Here, at the ends of the shaving areas N, an overcut 10 is provided in each case. The concavely designed overcut 10 which is in each case a portion of the shaving area N, is set back with respect to an undisturbed contour K* that would homogenously connect the adjacent areas, so that in the final punching of the tooth plate 1, no punch chips with minimal material thickness are formed as the punch for punching does not have to approach the tooth plate contour tangentially in the transitional area between shaved section and only punched section, but cuts the contour of the overcut 10 which is usually already formed in the shaving operation, at an angle.

Figure 2A:
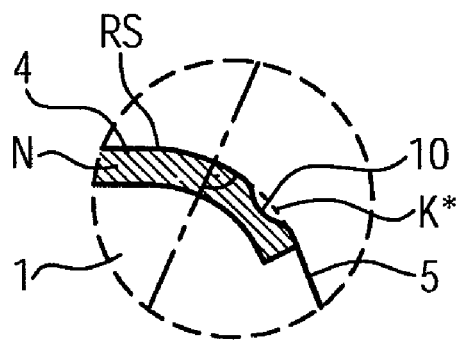

FIG. 2a shows an enlargement of the transitional area IIa between the back portion 4 and the front side area 5 of FIG. 1. The shaving area N of the back portion 4 extends into the front side area 5. The overcut 10 can be seen at the end of the shaving area N, where it becomes clear that the indentation of the overcut 10 starts with respect to an undisturbed contour K* at a distance to the end of the straight back portion 4, 4' or the beginning of the bent front side area 5 defined by the reversal point RS. Compared to a back portion 4 located in conventional tooth plates between the mid-perpendicular MS, the overcut 10 is even further away.

Figure 2B:
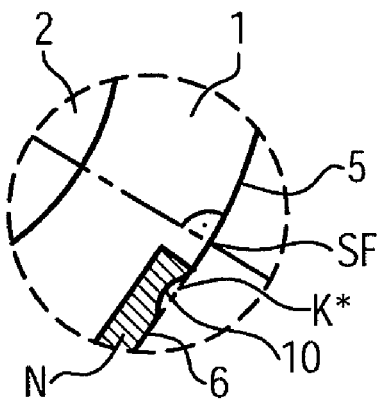

FIG. 2b in contrast shows an enlargement of the transitional area IIb between the outer flank 6 and the front side area 5 of FIG. 1. Here, too, the reversal point SF indicates the transition between the outer flank 6 and the bent front side area 5, where the shaving area N of the outer flank 6 or the complete shaving area N over the teeth 3 is arranged at a distance to the reversal point SF. This makes clear that the overcut 10 is arranged in the area of the outer flank 6 in front of the transition to the bent front side area 5. Here, too, the overcut 10 is again set back with respect to an undisturbed contour K* homogenously connecting the adjacent areas of the tooth plate contour, the contour K* being in this case formed as a straight line. Thus, the overcut 10 is still located in the straight section of the outer flank 6 of the tooth plate contour, where the overcut 10 is already located so close to the point SF that it is outside the section of the outer flank 6 which is engaged with an associated chain wheel.

The enlarged representation of the bent front side area 5 as well as of the adjacent sections of the tooth plate contour and the hinge opening 2 in FIG. 3a and FIG. 3b illustrates the position of the overcuts 10 in relation to the center M of the hinge opening 2 as well as the particular shape of the tooth plate contour in an embodiment of the tooth plate 1 according to the invention. The front side area 5 of the tooth plate 1 extends, starting from the transition SF to the outer flank 6 over the side intersection SM resulting from the intersection of the front side area 5 of the tooth plate contour with the center line MA through the centers M of the hinge openings 2, to the back intersection RM resulting from the intersection of the mid-perpendicular MS through the center M of the hinge opening 2 with the back 4 of the tooth plate contour, wherein the mid-perpendicular MS is perpendicular to the straight back 4 as well as to the center line MA. The last portion of the front side area 5 is formed as an elongation 4' of the back 4, so that the "straight" back 4 extends over the back intersections MS in an unchanged geometric form to the reversal point RS. Here, the tooth plate contour of the inventive tooth plate 1 shown here projects in the front side area 5 with respect to a conventional contour K' as it is generally found in tooth plates of the prior art. The conventional contour K' extends in the bent front side area 5 from transition SF over the side intersection SM to the back intersection RM at an essentially constant distance or at a distance continuously changing corresponding to the distance of the intersections SF, SM, and RM to the center M of the adjacent hinge opening 2. In a purely material-optimized tooth plate of the prior art, the distances of the intersections SF, SM, and RM to the center are equal, so that a material strip with an essentially equal width extends around the hinge opening 2 over the bent front side area 5, where the conventional contour K' extends around the center in an arc of a circle. Between the conventional contour K' and the tooth plate contour of a tooth plate 1 according to the invention, in the bent front side area 5 a projecting area B is formed in which the overcut 10 is arranged at the end of the shaving area N of the back 4. Here, the undisturbed contour K* which extends over the indentation of the overcut 10 has the longest radial distance to the center M. The difference between the conventional contour K' and the tooth plate contour with a projecting area B can also be clearly seen in FIG. 4 in which the area B of the tooth plate 1 is seen under the rounded outer plate 17.

The overcut 10 at the outer flank 6 is offset with respect to the side intersection SM in the bent front side area 5 by an angle $\alpha$ of approx. 39° around the center M of the circular hinge opening 2 or the hinge opening 2 shaped for two rocker joints. Here, the section of the bent front side area 5 can extend between the side intersection SM and the reversal point SF over an angular area at an angle $\epsilon$ of 30° to 40°, in particular 33° to 38°, around the center M of the hinge opening 2.

The overcut 10 at the end of the area N shaved over the back 4, 4' is located in the section of the bent front side area 5 which projects furthest with respect to the center M, where the radial distance with respect to the center M is enlarged compared to the side intersection SM as well as compared to the back intersection RM. In relation to the side intersection SM, the overcut 10 is offset at the end of the area N shaved over the back 4 by an angle $\gamma$ of approx. 63° around the center M of the hinge opening 2.

Next to the elongation 4' of the straight back 4 beyond the back intersection RM, on the other side of the overcut 10 a straight tangential section T is provided. This tangential section T starts at a distance from the side intersection SM, where a straight line through the starting point TS of the tangential section T and the center M of the hinge opening 2 with the center line MA include an angle $\beta$ of 18°. As the straight tangential section T extends towards the overcut 10 at the angle of a tangent in the starting point TS, the tangential section T also extends at an angle of 18° with respect to a vertical to the center line MA. The tangential section T extends from its starting point TS to the proximity of the overcut 10. Between the ends of the straight tangential section T facing each other and the straight elongation 4' of the back 4, the undisturbed tooth plate contour is formed as a segment of a circle, wherein the center of the segment of a circle is located on the straight line G which extends through the center M of the circular hinge opening 2 or the hinge opening formed for two rocker joints. Here, the straight line G in relation to the side intersection SM is offset by an angle $\delta$ of 50° to 60°, preferably of 53° to 58°, around the center M of the hinge opening 2 towards the back intersection RM.

The tooth plate 1 represented in FIG. 1 is produced with the shaving technique where first the areas of the tooth plate contour to be shaved are pre-punched from a steel plate or a steel band with oversize, in this case the shaving areas N of the back portion 4 and the teeth 3 as well as usually the hinge openings 2. After the pre-punching of the areas of the tooth plate contour to be shaved, the tooth plate is still stably connected to the steel plate by the two front side areas 5 and can thus correspondingly be accurately guided. In the next processing step, the pre-punched contours are shaved, where a shaving die punches the contour pre-punched with oversize to its end measure. Here, the thickness of the separated chip is only approx. 10% of the thickness of the tooth plate, i.e. usually approx. 0.2 mm. Even after shaving, the tooth plate 1 is still stably connected to the work piece by the front side areas 5. Only after all desired surfaces of the tooth plate contour and the hinge openings 2 have been shaved, the tooth plate 1 is punched out of the tool at the bent front side areas 5. In the normal punching used for punching out the front side areas 5, the surface quality of the cut edge is clearly worse compared to the shaved areas of the tooth plate contour, i.e. there is a tear-free shear cut only over approx. 30% of the material thickness of the tooth plate 1. During punching, in particular the transitional area of the shaved areas and the normally punched areas of the tooth plate contour, i.e. the overcut 10, which is in the embodiment of the tooth plate 1 according to the invention arranged in a low-stress zone of the tooth plate 1, is of particular interest. During punching, the cutting edge of the punch hits the tooth plate contour already shaved in the overcut 10 at a sufficiently large angle, so that flowing of the tooth plate material or a perpendicular deflection of the punch are prevented.

Figure 4:
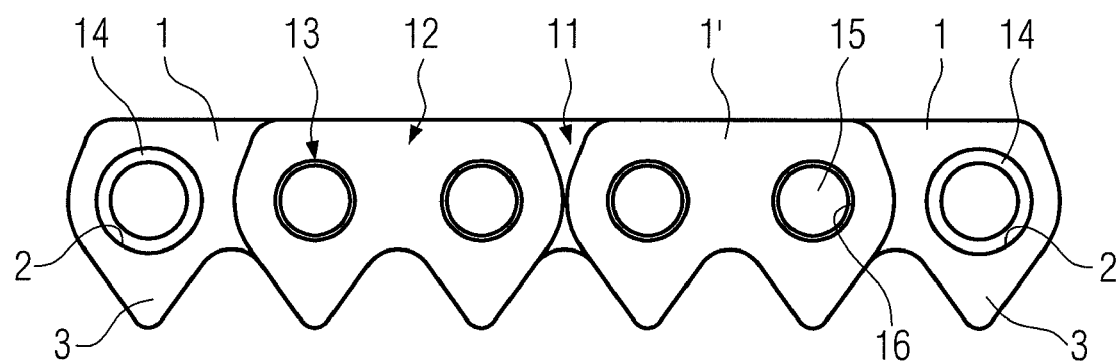
FIG. 4 shows a detail of an inverted tooth chain according to the invention in a side view.
Figure 5:
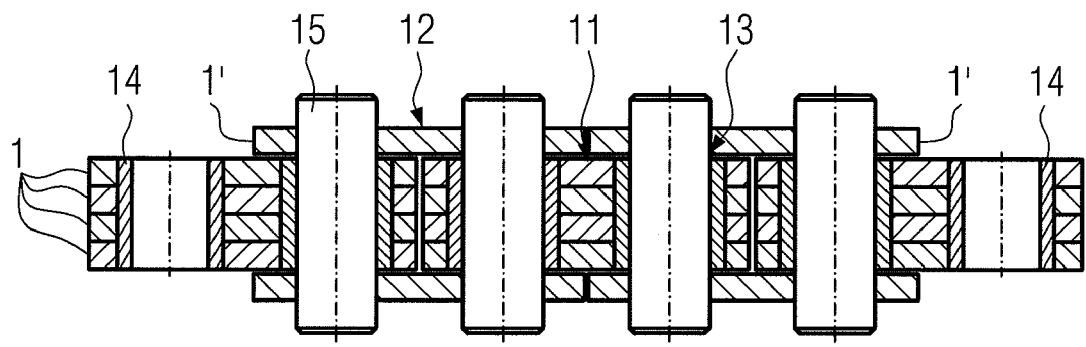
FIG. 5 shows the inverted tooth chain of FIG. 4 in a plan view.
Figure 6:
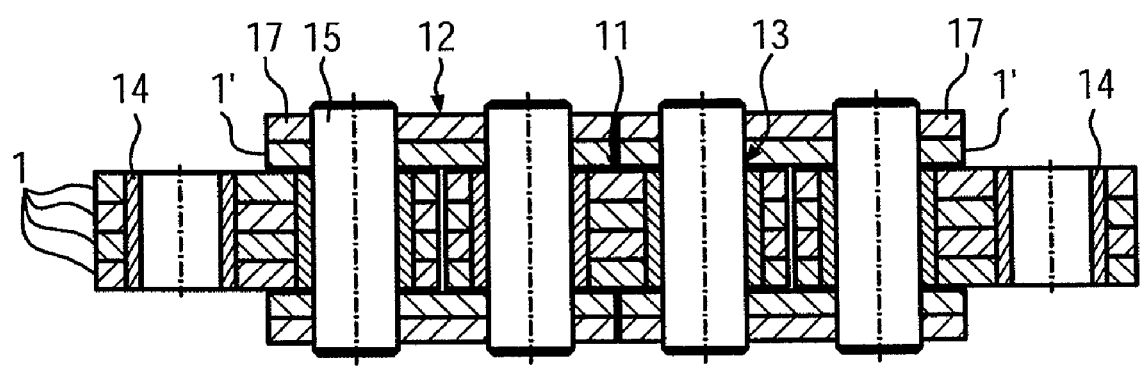
FIG. 6 shows an alternate embodiment of an inverted tooth chain in plan view.

In FIG. 4 and FIG. 5, a detail of an inverted tooth chain is represented in which alternately inner chain links 11 and outer chain links 12 are provided which are interconnected via chain links 13. The inner chain link 11 consists of four tooth plates 1 according to the invention, wherein the tooth plates 1 are arranged directly one next to the other for forming a plate package on a hinge sleeve 14. An alternating arrangement of the tooth plates 1 as well as an arrangement directly on the hinge pin 15 are also possible. In the alternate embodiment of FIG. 6, the outer chain links 12 each consist of two tooth plates 1' according to the invention and two outer plates 17 each arranged outside with a normal oblong shape with semi-circularly rounded front sides as well as two pins 15 arranged in parallel one to another and extending perpendicularly to the tooth plates 1, 1' and the outer plates 17. Alternatively, the tooth plates 1' can also simultaneously take over the function of the outer plates 17, so that one can dispense with independent outer plates 17, as shown in FIGS. 4 and 5. Returning to FIG. 6, the hinge pins 15 extend through the sleeve 14 and through the tooth plates 1' and the externally arranged outer plates 17 of the outer chain link 12. The tooth plates 1' and the outer plates 17 comprise two openings 16 arranged at a distance one to another to be pressed onto the hinge pins 15, wherein the openings 16 have a smaller diameter than the hinge openings 2 of the tooth plates 1 of the inner chain link 11. In case of the tooth plates 1 of the inner chain link being used without a sleeve 14, the hinge openings 2 arranged at a distance one to another comprise a small clearance with respect to the hinge pin 15. In contrast, the tooth plates 1 in the sleeve chain which is shown in FIGS. 4 and 5 is slightly pressed onto the sleeve 14.

The invention claimed is:

1. Tooth plate for an inverted tooth chain comprising two hinge plate openings spaced apart in a longitudinal direction of the tooth plate, the two hinge plate openings each having a center, the tooth plate further comprising a center line disposed in the longitudinal direction along a line connecting the centers of the two hinge plate openings, the tooth plate further comprising a tooth plate contour comprising two teeth arranged on one side in the longitudinal direction, which are each limited by an outer flank and an inner flank, a back arranged on the other side in the longitudinal direction, and two unshaved bent front side areas connecting the teeth with the back, wherein the tooth plate contour has at least one shaved section, the shaved section is shaved and comprises ends and at least one shaved overcut at one of the ends of the shaved section, the shaved overcut is set back with respect to adjacent areas of the tooth plate contour, wherein the at least one shaved section extends along the back and at least one shaved overcut is arranged in the bent front side area of the tooth plate contour adjacent the back, and wherein the bent front side area of the tooth plate contour adjacent to the back has a projecting area that projects between a back intersection between the back and a mid-perpendicular through the hinge opening and a side intersection of the bent front side area with the center line in the longitudinal direction of the tooth plate with respect to a contour that continuously extends in a curved manner around the center of the hinge opening wherein the shaved overcut is arranged in the projecting area of the tooth plate contour.

2. Tooth plate according to claim 1, wherein the back is arranged essentially in parallel to the center line, wherein the parallel section of the back extends over the back intersections between the back and a mid-perpendicular through the hinge openings.

3. Tooth plate according to claim 1, wherein the bent front side area comprises a straight tangential section between the side intersection and the back intersection, wherein the tangential section starts at a distance to the side intersection in a starting point and the inclination of a tangent in the starting point corresponds to the inclination of the tangential section.

4. Tooth plate according to claim 3, wherein the tangential section starts within an angular area around the center of the hinge opening of 10° to 25°.

5. Tooth plate according to claim 1, wherein the shaved overcut is arranged in the section of the projecting area of the tooth plate contour that is projecting furthest.

6. Tooth plate according to claim 1, wherein the shaved overcut is arranged at a distance from the center line within an angular area around the center of the hinge opening of 40° to 70°.

* * * * *